United States Patent
Ryu et al.

(10) Patent No.: US 9,226,226 B2
(45) Date of Patent: Dec. 29, 2015

(54) METHOD AND APPARATUS OF PERFORMING A DISCOVERY PROCEDURE

(71) Applicant: LG ELECTRONICS INC., Seoul (KR)

(72) Inventors: Kiseon Ryu, San Diego, CA (US); Sanggook Kim, San Diego, CA (US); Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 14/132,772

(22) Filed: Dec. 18, 2013

(65) Prior Publication Data

US 2014/0295832 A1    Oct. 2, 2014

Related U.S. Application Data

(60) Provisional application No. 61/805,494, filed on Mar. 26, 2013.

(51) Int. Cl.
*H04W 48/16* (2009.01)
*H04W 72/04* (2009.01)
*H04W 8/00* (2009.01)

(52) U.S. Cl.
CPC ............ *H04W 48/16* (2013.01); *H04W 8/005* (2013.01)

(58) Field of Classification Search
CPC ..... H04W 48/16; H04W 48/18; H04W 48/20; H04W 88/06; H04W 48/12
USPC ................ 455/434, 67.12; 340/539.23, 686.6
See application file for complete search history.

(56) References Cited

U.S. PATENT DOCUMENTS

| 8,260,266 | B1 | 9/2012 | Amidon et al. |
| 2009/0259539 | A1 | 10/2009 | Dawson et al. |
| 2011/0268101 | A1* | 11/2011 | Wang et al. ............ 370/344 |
| 2013/0003591 | A1* | 1/2013 | Novak et al. ............ 370/252 |
| 2013/0308551 | A1* | 11/2013 | Madan et al. ............ 370/329 |
| 2014/0036792 | A1* | 2/2014 | Li et al. ............ 370/329 |
| 2014/0126460 | A1* | 5/2014 | Bienas et al. ............ 370/315 |

(Continued)

FOREIGN PATENT DOCUMENTS

WO    WO 2004/088934 A2    10/2004
WO    WO 2005/006145 A2    1/2005

OTHER PUBLICATIONS

3GPP TR 22.803 V12.0.0, "3rd Generation Partnership Project; Technical Specification Group Services and System Aspects; Feasibility study for Proximity Services (ProSe) (Release 12)", Dec. 2012, pp. 1-40.

*Primary Examiner* — Allahyar Kasraian
*Assistant Examiner* — B.M. M Hannan
(74) *Attorney, Agent, or Firm* — Birch, Stewart, Kolasch & Birch, LLP (57) ABSTRACT

The present invention is directed to a method and an apparatus for use in a wireless communication system. Specifically, the present invention is directed to a method of performing a discovery procedure for a ProSe and an apparatus therefore, in which the method comprises: receiving first resource allocation information for plural ProSe channels from a base station via a broadcast signal; sensing the plural ProSe channels; transmitting a sensing result for the plural ProSe channels to the base station; receiving second resource allocation information indicating one of the plural ProSe channels from the base station via a unicast signal; and transmitting a discovery signal via the ProSe channel indicated by the second resource allocation information.

10 Claims, 9 Drawing Sheets

(56) References Cited

U.S. PATENT DOCUMENTS

2014/0153417 A1* 6/2014 Gupta et al. ............... 370/252
2014/0153509 A1* 6/2014 Guo .......................... 370/329
2014/0313949 A1* 10/2014 Lilleberg et al. ........... 370/280

* cited by examiner

METHOD AND APPARATUS OF PERFORMING A DISCOVERY PROCEDURE

CROSS REFERENCE TO RELATED APPLICATIONS

This application claims priority under 35 U.S.C. §119(e) to U.S. Provisional Application No. 61/805,494 filed on Mar. 26, 2013. The entire contents of the above application is hereby incorporated by reference.

TECHNICAL FIELD

The present invention is directed to a method and an apparatus for use in a wireless communication system. Specifically, the present invention is directed to a method and an apparatus of performing a discovery procedure, preferably a Proximity-based Service (ProSe) discovery procedure.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and the like.

DISCLOSURE

Technical Problem

An object of the present invention is to provide a method and an apparatus of efficiently performing a discovery procedure, preferably a ProSe discovery. Another object of the present invention is to provide a method and an apparatus of efficient resource allocation for a discovery procedure, preferably a ProSe discovery procedure.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As a first aspect of the invention, a method of performing a discovery procedure for a Proximity-Based Service (ProSe) by a User Equipment (UE) in a cellular communication system is provided, in which the method comprises: receiving first resource allocation information for plural ProSe channels from a base station via a broadcast signal; sensing the plural ProSe channels; transmitting a sensing result for the plural ProSe channels to the base station; receiving second resource allocation information indicating one of the plural ProSe channels from the base station via a unicast signal; and transmitting a discovery signal via the ProSe channel indicated by the second resource allocation information.

As a second aspect of the invention, a User Equipment (UE) configured to perform a discovery procedure for a Proximity-based Service (ProSe) in a cellular communication system is provided, in which the UE comprises: a radio frequency (RF) unit; and a processor, wherein the processor is configured: to receive first resource allocation information for plural ProSe channels from a base station via a broadcast signal, to sense the plural ProSe channels, to transmit a sensing result for the plural ProSe channels to the base station, receive second resource allocation information indicating one of the plural ProSe channels from the base station via a unicast signal, and to transmit a discovery signal via the ProSe channel indicated by the second resource allocation information.

Preferably, the sensing result may include information indicating one or more idle ProSe channels of the plural ProSe channels.

Preferably, the sensing may be performed on a subset of the plural ProSe channels.

Preferably, the subset of the plural ProSe channels may be identified by using at least one of information related to the UE or information related to the ProSe.

Preferably, the information related to the UE may include a UE Identity (ID), and the information related to the ProSe includes at least one of a service category and a service Identity (ID).

Advantageous Effects

Exemplary embodiments of the present invention have the following effects. In accordance with the embodiments of the present invention, efficient discovery procedure is provided.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
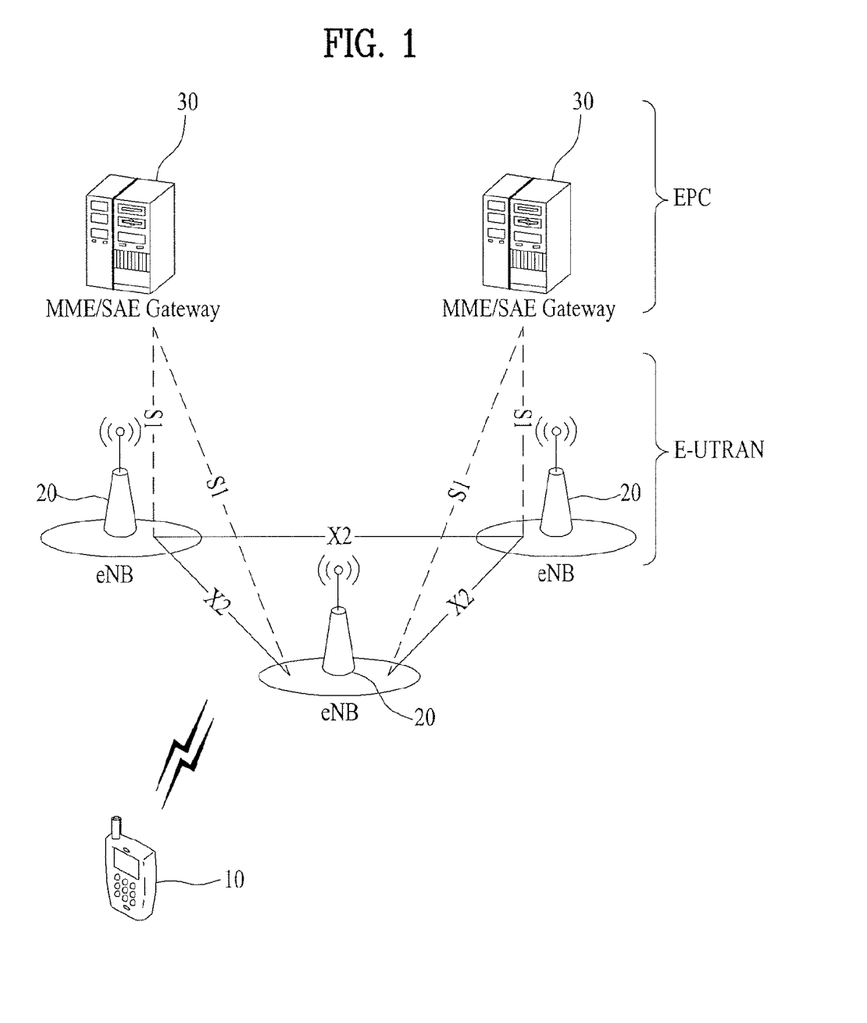
FIG. 1 illustrates a network structure of an Evolved Universal Mobile Telecommunication System (E-UMTS).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

With reference to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20. Here, "downLink (DL)" refers to communication from the eNB 20 to the UE 10, and "UpLink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
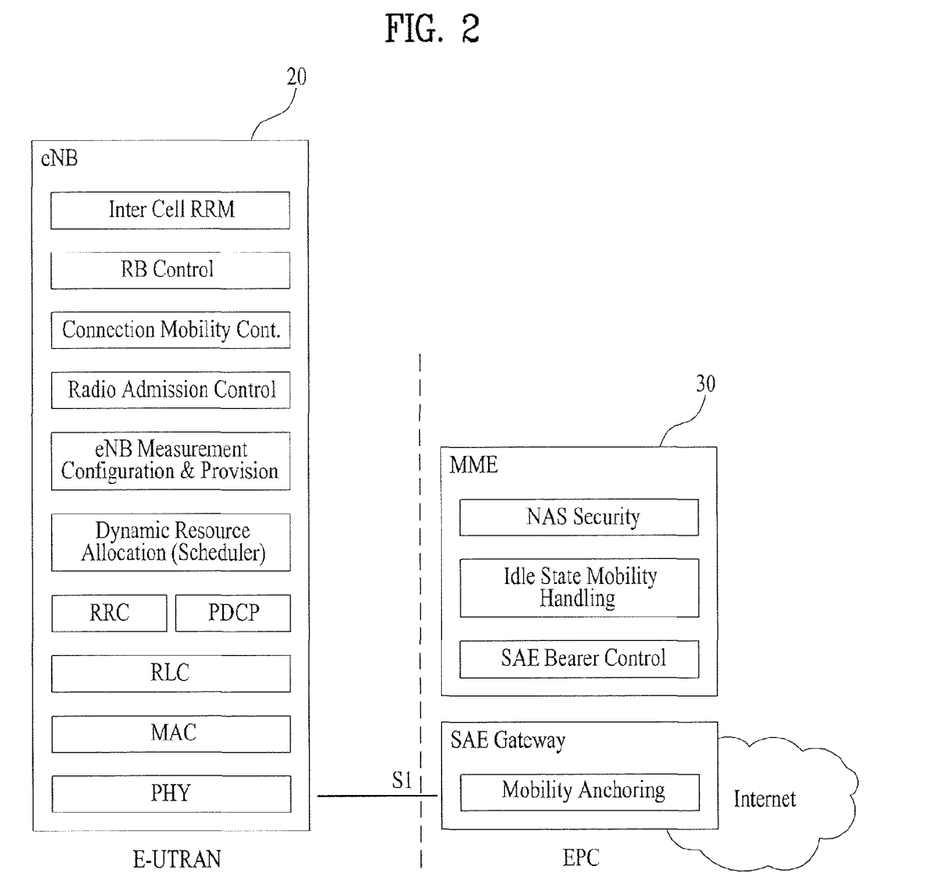
FIG. 2 illustrates a general structure of a typical E-UTRAN and that of a typical Evolved Packet Core (EPC).

FIG. 2 is a block diagram depicting general structures of an E-UTRAN and an EPC. With reference to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
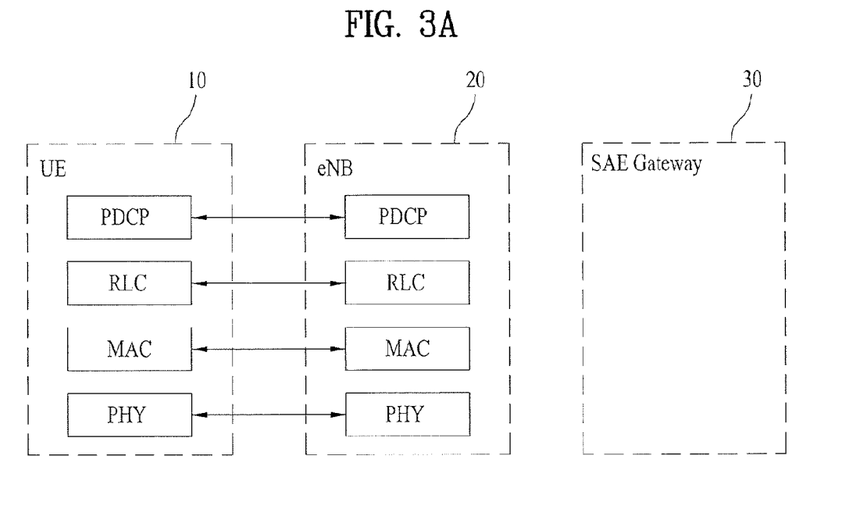
FIGS. 3a-3b illustrate a user-plane protocol and a control-plane protocol stack for the E-UMTS network
Figure 3B:
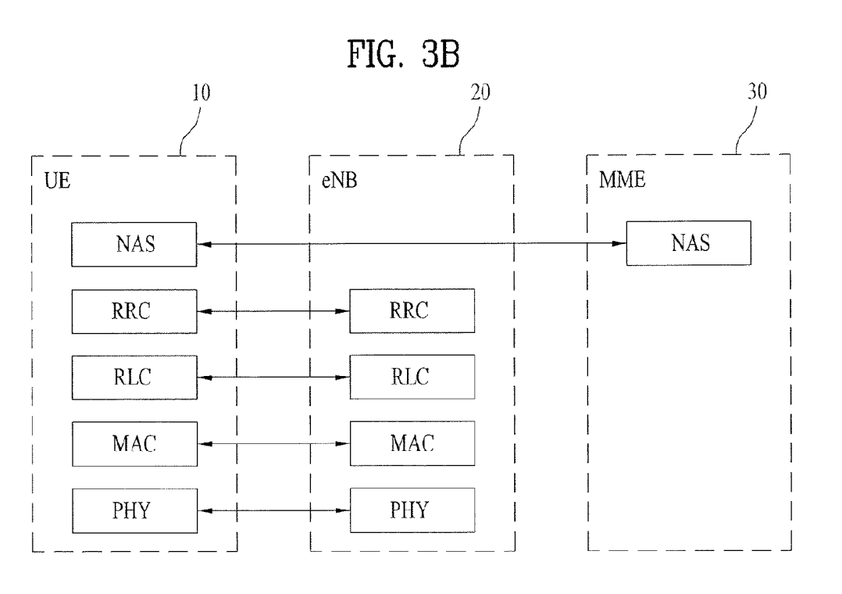

FIGS. 3a-3b illustrate the user-plane protocol and the control-plane protocol stack for the E-UMTS network. With reference to FIGS. 3a-3b, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3a-3b as being separate from the MAC layer, it is understood that the functions of the RLC layer may be performed by the MAC layer and that, therefore, a separate RLC layer is not required.

With reference to FIG. 3a, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

With reference to FIG. 3b, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

With reference to FIG. 3a, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

With reference to FIG. 3b, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution-Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, and the network can control mobility (handover) of the UE.

Figure 4:
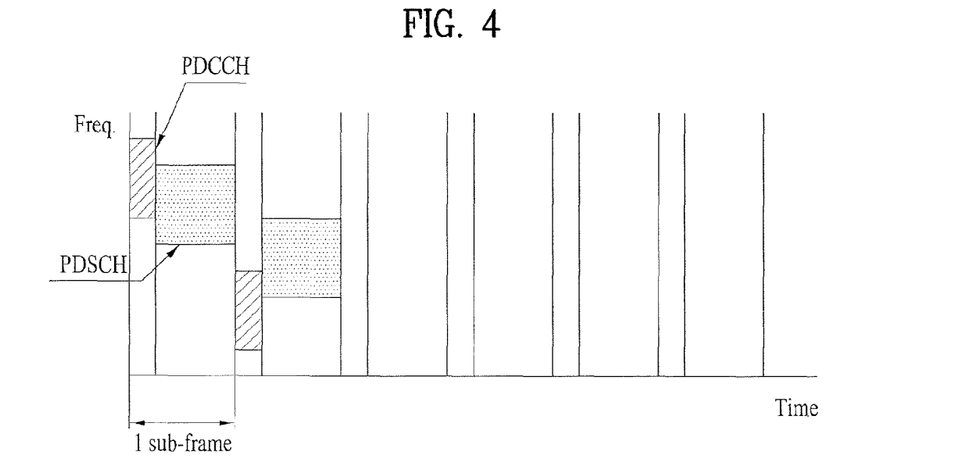
FIG. 4 illustrates a downlink subframe and physical channels.

FIG. 4 illustrates a downlink subframe and physical channels.

With reference to FIG. 4, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE(-A), for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

To initiate access to the network, a random access procedure is used. The random access procedure is also referred to as a Random Access Channel (RACH) procedure. Physical Random Access Channel (PRACH) transmission is under control of higher layer protocol which performs some important functions related to priority and load control. The PRACH is a common physical channel dedicated to the random access procedure. There are two kinds of RACH procedures: contention-based RACH procedure and non-contention-based RACH procedure. In the contention-based RACH procedure, many UEs can attempt to access the same base station simultaneously using same RACH preamble/resources, which may lead to network access congestions/collisions. Hereinafter, unless mentioned otherwise, a RACH (or RA) procedure means a contention-based RACH (or RA) procedure.

A RACH procedure can be used for several purposes. For example the RACH procedure can be used to access the network, to request resources, to carry control information, to adjust the time offset of the uplink in order to obtain uplink synchronization, to adjust the transmitted power, etc.

A RACH procedure can be initiated by the UE or the eNB. The RACH procedure may, for instance, be triggered by the following events:

A UE switches from power-off to power-on and needs to be registered to the network.

A UE is not time-synchronized with an eNB and starts transmitting data (for instance the user calls).

An eNB starts transmitting data to the UE but they are not synchronized (for instance the user receives a call).

An eNB measures a delay of the received signal from the UE (for instance the user is moving and has lost synchronization).

Figure 5:
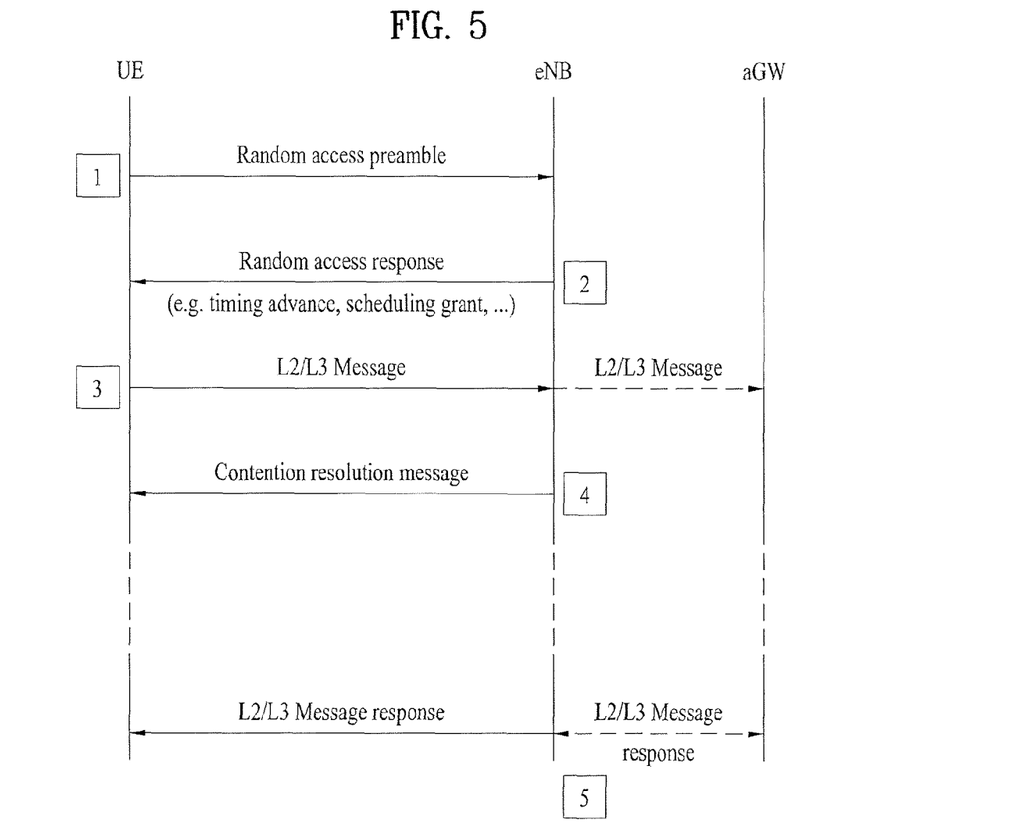
FIG. 5 illustrates a contention-based Random Access (RA) procedure.

FIG. 5 illustrates a contention-based random access procedure.

With reference to FIG. 5, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response and adapts UL transmission timing, and UL transmission power if the random access response contains power control information.

The UE then sends a resource request message (message 3, box 3) via an uplink shared channel. In the message 3, the UE requests bandwidth and time resources to transmit data and it also indicates a UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with a UE-specific signature, the eNB checks how many UEs were detected with the same signature and resolves any possible contentions. If the preamble sent by a UE was in collision with a preamble from another UE, the eNB sends a contention resolution message (message 4, box 4) to command a corresponding UE to restart the RACH procedure. If the UE was not in collision, the eNB sends a resource assignment message (message 5, box 5). Subsequent transmissions are carried out as usual.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. In addition, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example:

Commercial/social use

Network offloading

Public Safety

Integration of current infrastructure services, to assure the consistency of the user experience including reachability and mobility aspects Public Safety, in case of absence of EUTRAN coverage (subject to regional regulation and operator policy, and limited to specific public-safety designated frequency bands and terminals)

Figure 6:
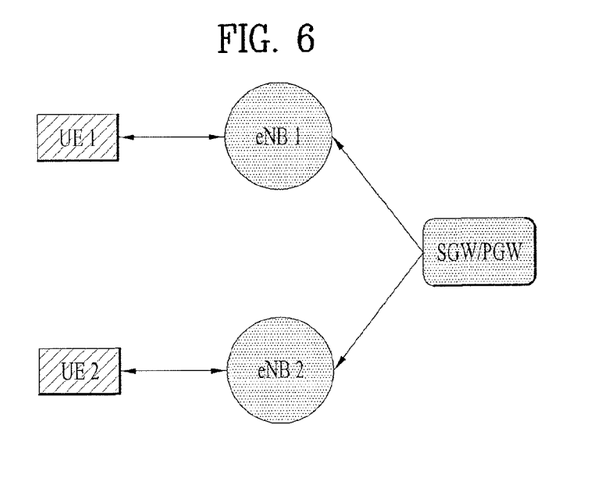
FIG. 6 illustrates an example of default data path for a normal communication.

FIG. 6 illustrates an example of default data path for communication between two UEs. With reference to FIG. 6, even when two UEs (e.g., UE 1, UE 2) in close proximity communicate with each other, their data path (user plane) goes via the operator network. Thus a typical data path for the communication involves eNB(s) and/or Gateway(s) (GW(s)) (e.g., SGW/PGW).

Figure 7:
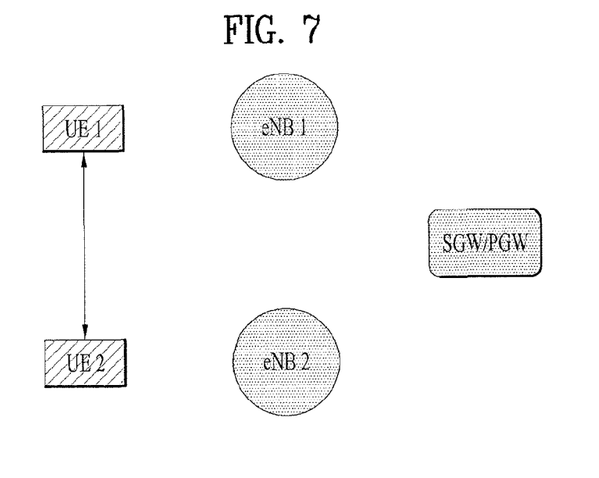
FIGS. 7-8 illustrate examples of data path scenarios for a proximity communication.
Figure 8:
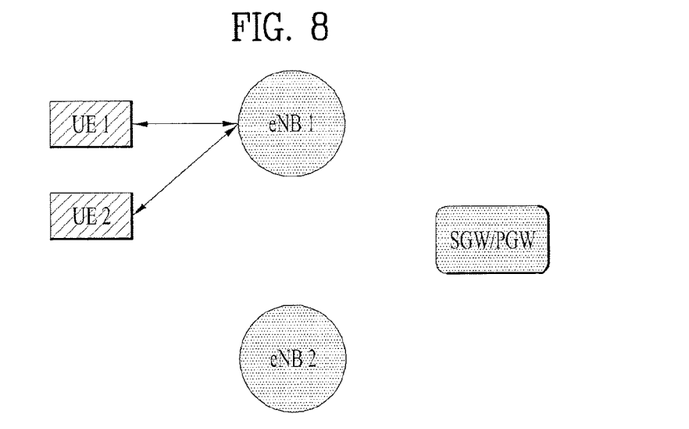

FIGS. 7-8 illustrate examples of data path scenarios for a proximity communication. If wireless devices (e.g., UE 1, UE 2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Example

Resource Allocation for ProSe Discovery

In order to initiate ProSe communication, ProSe-enabled UEs firstly have to discover other ProSe-enabled UE in proximity (e.g., a crime scene, a fire scene). Two types of ProSe discoveries are defined: (i) Open ProSe Discovery means a ProSe Discovery without an explicit permission from the UE being discovered, and (ii) Restricted ProSe Discovery means a ProSe Discovery that only takes place with an explicit permission from the UE being discovered.

ProSe discovery procedure may be generally performed as follows:

- UE (i.e., ProSe discovering UE) sends a predefined radio signal (hereinafter, a ProSe discovery signal) for ProSe discovery with/without a certain periodicity when it needs to initiate a ProSe communication path with other UE (i.e., ProSe discovered UE), wherein the ProSe discovery signal is used for a ProSe-enabled UE to discover other ProSe-enabled UE;
- If a ProSe discovered UE receives the ProSe discovery signal, the ProSe discovered UE may respond to the ProSe discovering UE; and
- ProSe-enabled UEs negotiate their ProSe capabilities to establish the ProSe direct communication path between them.

The ProSe discovery procedure can be performed with an assistance of a network (hereinafter, network assisted ProSe discovery), or without the assistance of the network (hereinafter, device-to-device ProSe discovery). The network assisted ProSe discovery can be performed if ProSe-enabled UEs are within the coverage of cellular network. Meanwhile, the device-to-device ProSe discovery can be performed after the network assisted ProSe discovery is once performed, or directly if ProSe-enabled UEs are out of the coverage of cellular network.

Once a ProSe-enabled UE discovers other ProSe-enabled UE which it wants to communicate with, a ProSe connection setup procedure may be performed to provide a ProSe direct communication. In the ProSe direct communication, data traffics can be exchanged through a direct communication path between ProSe-enabled UEs.

The ProSe discovery procedure requires ProSe-enabled UEs: to reserve radio resources for transmission and reception of a ProSe discovery signal, and to consume powers to send/monitor the ProSe discovery signal. Radio resource for the ProSe discovery may be reserved among radio resources of a cellular system (e.g., E-UTRAN) or radio resources of WLAN (e.g., Wi-Fi system). Thus it is necessary to manage radio resources for the ProSe discovery to minimize interference to/from other ProSe/Non-ProSe-enabled UE/eNB.

To this end, the present invention proposes efficient resource allocation methods for the ProSe discovery. In the present invention, resource allocation for the ProSe discovery may be carried out through 2-sptes. In particular, in the 1st step, a set of ProSe resources can be assigned/reserved by a network entity (e.g., eNB). Here, the set of ProSe resources may mean a plurality of ProSe resource candidates that a ProSe-enabled UE needs to scan for identifying available ProSe resource(s) for ProSe discovery. Each ProSe resource may include a time-frequency resource unit. Then, in the 2nd step, a specific one of the plurality of ProSe resources can be assigned by the network entity to a ProSe-enabled UE for actual transmission of a ProSe discovery signal, based on congestion/usage state of the set of ProSe resources. For convenience, the set of ProSe resources can be referred to a ProSe resource region, and each ProSe resource can be referred to a ProSe discovery channel or a ProSe resource channel (simply, ProSe channel).

As an example, radio resource for ProSe discovery can be reserved by an eNB, and information about the radio resource can be broadcasted with control signaling (such as System Information Block, SIB) to a ProSe-enabled UE that wants to initiate ProSe discovery procedure. In this case, the ProSe-enabled UE may scan the radio resource reserved by the eNB and report a scanning result to the eNB before transmitting a ProSe discovery signal. Then, based on the scanning result, the eNB may transmit a radio resource assignment indicating a specific radio resource to the ProSe-enabled UE. Here, the specific radio resource is used for actual transmission of the ProSe discovery signal. The radio resource assignment can be informed by unicast control signaling such as a Medium Access Control (MAC) message, a PDCCH signal and the like. In summary, radio resources for ProSe discovery signal can be assigned as follows in view of a ProSe-enabled UE: (i) being assigned ProSe channel(s), (ii) sensing ProSe channel (s), (iii) reporting to an eNB if idle ProSe channel(s) is detected, and (iv) being assigned a ProSe channel for actual transmission of a ProSe discovery signal.

Figure 9:
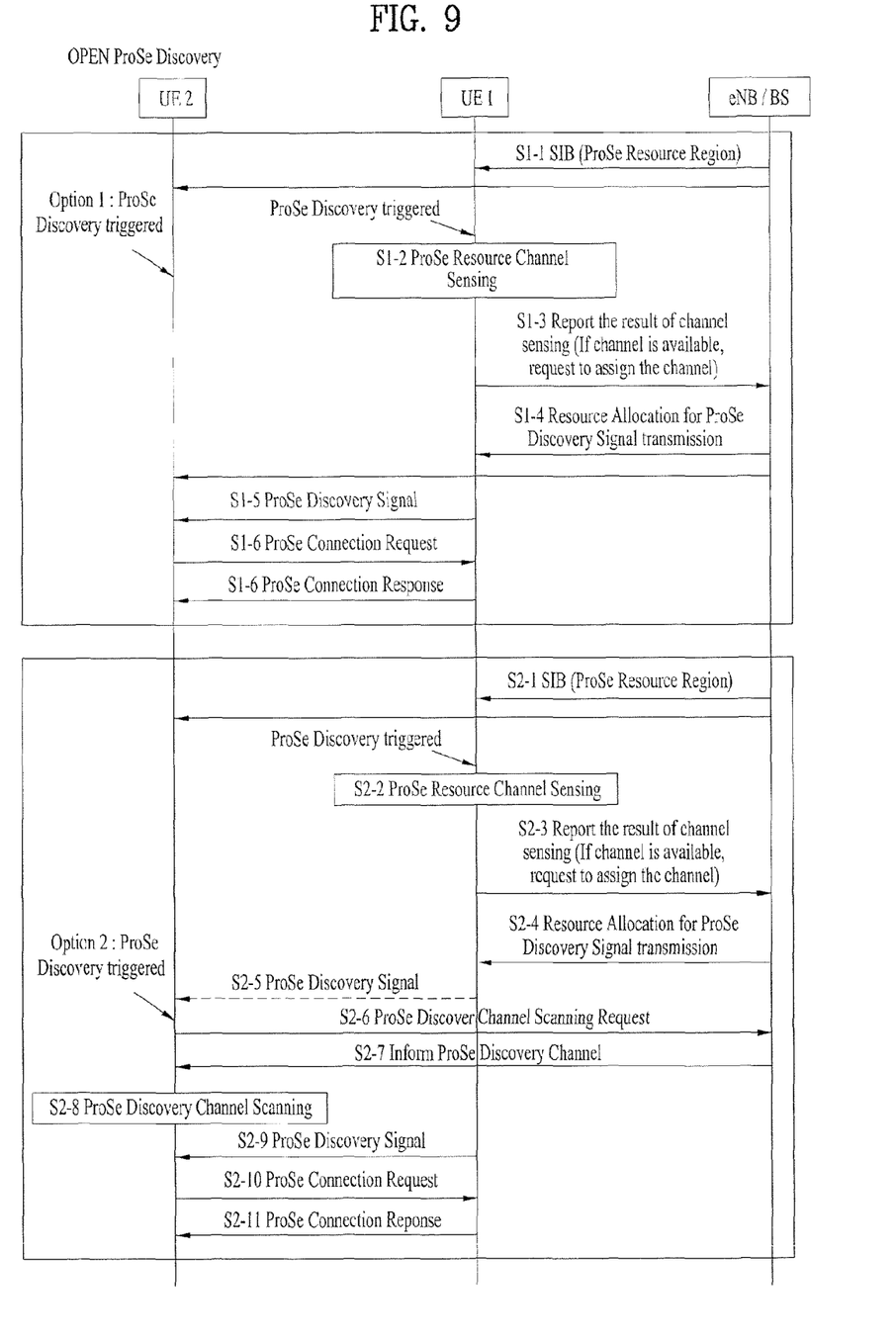
FIGS. 9-10 show a ProSe discovery procedure in accordance with the present invention.
Figure 10:
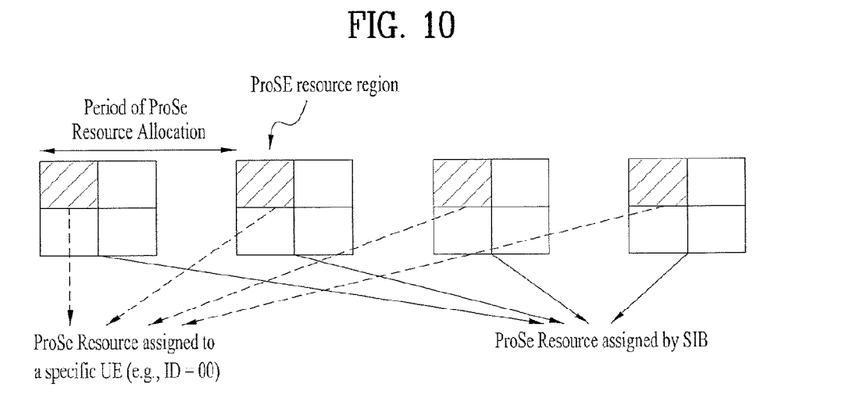

FIGS. 9~10 show a ProSe discovery procedure in accordance with the present invention. FIG. 9 shows two proposed options for ProSe discovery procedure, and FIG. 10 shows an example of ProSe resource assignment. FIG. 9 shows examples of open ProSe discovery (i.e., does not need a permission from a ProSe discovered UE), but the proposed ProSe resource allocation method can be also applied to a restricted ProSe discovery.

In the proposed ProSe discovery procedures, it may be assumed that when ProSe-enabled UEs register to a ProSe-related network entity (e.g., MME, ProSe server or ProSe controller), location/proximity/mobility information of the ProSe-enabled UEs can be tracked or updated at the ProSe-related network entity and provided to corresponding eNBs/BSs. In addition, the ProSe-related network entity may manage ProSe resources and control ProSe procedures based on location/proximity/mobility information of the ProSe-enabled UEs. For example, the ProSe-related network entity may provide an eNB with configuration information regarding ProSe resources, and the eNB may transmit at least part of the configuration information to corresponding ProSe-enabled UEs. The configuration information may include resource assignments for ProSe discovery signal, such as sequence information (e.g., a root sequence index, a cyclic shift value when Zadoff Chu sequence is used), a transmission period, radio resources (e.g., time-frequency resource, e.g., a resource block set), Tx power, etc.

Option 1: Tx/Rx of ProSe Discovery Signal triggered by UEs' proximity

Step 1 (S1-1): ProSe-enabled UEs may receive control information regarding ProSe resource region. The ProSe resource region includes a set of ProSe channels that a ProSe-enabled UE needs to scan for identifying available ProSe resources. The control information regarding ProSe resource region may be signaled in a cell-specific way (e.g., via broadcast information (e.g., SIB)) or in a group-specific way. The control information may be signaled periodically. The control information may indicate, for example, a time-frequency resource (e.g., resource block) assignment for ProSe resource region (in particular, resource assignment for each of ProSe channels), a resource assignment periodicity for ProSe resource region, a scaling factor, etc. The scaling factor can be used for a ProSe-enabled UE to calculate its own resource of the whole ProSe resources. For example, if four resource opportunities (e.g., four ProSe channels) are reserved per period as shown in FIG. 10 and if a scaling factor is given as eight, a ProSe-enabled UE can be assigned its ProSe resource every other period of ProSe resource assignment. The ProSe resource region may be reserved per cell.

Step 2 (S1-2): If ProSe-enabled UEs need to initiate a ProSe discovery procedure, a ProSe discovering UE (e.g., UE 1) may scan at least part of the ProSe resource region to find available ProSe resource(s) before sending a ProSe discovery signal. A subset of the ProSe resource region may be assigned to UE 1 for scanning. For example, one or more ProSe channels in the ProSe resource region may be implicitly assigned to UE 1 for scanning. For example, the one or more ProSe channels may be implicitly assigned based on at least one of information related to UE 1 or information related to ProSe. The information related to UE 1 may include an Identity (ID) of UE 1, and the information related to ProSe may include at least one of a service category and a service Identity (ID). For example, as shown in FIG. 10, a value of Least Significant Bit (LSB) 2 bit of UE's ID may be used to indicate which ProSe channel(s) is assigned for scanning as follows:

ID=00: 1st resource opportunity (e.g., 1st ProSe channel) of the ProSe resource region (or whole ProSe resource assigned for ProSe discovery signal).

ID=01: 2nd resource opportunity of the ProSe resource region.

ID=10: 3rd resource opportunity of the ProSe resource region.

ID=11: 4th resource opportunity of the ProSe resource region.

Step 3 (S1-3): If UE 1 detects available ProSe channel(s) (i.e., idle ProSe channel(s)), UE 1 may report a channel sensing result and request assignment of ProSe channel to an eNB. The channel sensing result may include information indicating one or more idle ProSe channels of the plural ProSe channels.

Step 4 (S1-4): The eNB may assign a ProSe channel used for transmission of a ProSe discovery signal to UE 1 based on the channel sensing result. Assignment of the ProSe channel may be signaled to each UE via unicast signaling such as a MAC message, a PDCCH signal and the like. ProSe channel assigned to UE 1 may be re-assigned to other UE if both UEs are not interfered each other. Assignment of the ProSe channel may be effective for limited time duration after the ProSe channel is assigned. To this end, UE 1 may run a timer set to the limited time duration after assignment of the ProSe channel is received. The value of the timer may be preset, or signaled separately (e.g., via information regarding the ProSe resource region) or together with the assignment of the ProSe channel. Assignment of the ProSe channel for ProSe discovery signal transmission can be managed by a cellular network entity such as eNB/MME/ProSe server/ProSe controller, based on UEs' location/proximity information in order to minimize interference.

Step 5 (S1-5): UE 1 may send a ProSe discovery signal by using the assigned ProSe channel. A conventional signal such as a pilot signal or a synchronization signal can be reused as the ProSe discovery signal in the assigned ProSe channel. In this case, if a UE detects the pilot signal or the synchronization signal, the UE may interpret usage of the pilot signal or the synchronization signal based on where the pilot signal or the synchronization signal is detected. For example, if the pilot signal or the synchronization signal is detected outside the assigned ProSe channel, it is interpreted as pilot signal or synchronization signal. Meanwhile, if the pilot signal or the synchronization signal is detected on the assigned ProSe channel, it is interpreted as a ProSe discovery signal. Alternatively, the ProSe discovery signal may be newly designed. In this case, the ProSe discovery signal may be designed by the following rules: (i) signal sequence is distinguishable from other ProSe-enabled UEs' signal sequences, and (ii) signal sequence may be easily detected by ProSe-enabled UE.

Step 6 (S1-6): If UE 2 receives a ProSe discovery signal from UE 1, UE 2 may request a ProSe connection setup to UE 1.

Step 7 (S1-7): UE 1 may respond to UE 2 with a ProSe connection response, and a ProSe communication connection can be established between UE 1 and UE 2. Establishing the ProSe communication connection includes (i) resource assignment/negotiation to be used for ProSe direct communication (e.g., contention based resource, non-contention based resource, persistent resource allocation), and (ii) PHY parameter negotiation (e.g., MCS, Tx Power, HARQ parameter, channel measurement/report parameter). After the ProSe communication connection is established, data traffic can be exchanged through a ProSe direct communication path between UE 1 and UE 2.

The option 1 shows a network assisted ProSe discovery procedure initiated by UE 1. Meanwhile, UE 1 may initiate a Device to Device ProSe discovery procedure, (i) if UE 1 is in the coverage of cellular network but if UE 2 to be discovered is possible to be in proximity, or (ii) if UE 1 is not in the coverage of cellular network. In case of the Device to Device ProSe discovery procedure, the above Step 3 (S1-3) and Step 4 (S1-4) are skipped, and Step 5 (S1-5) can be replaced with: If UE 1 detects available ProSe channel(s) (i.e., idle ProSe channel(s)), UE 1 may send a ProSe discovery signal by using at least one of the available ProSe channel(s).

Option 2: Tx of ProSe Discovery Signal periodically and Rx of ProSe Discovery Signal triggered by UE's proximity Step 1 (S2-1): ProSe-enabled UEs may receive control information regarding ProSe resource region. The ProSe resource region includes a set of ProSe channels that a ProSe-enabled UE needs to scan for identifying available ProSe resources. The control information regarding ProSe resource region may be signaled in a cell-specific way (e.g., broadcast information (e.g., SIB)) or in a group-specific way. The control information may be signaled periodically. The control information may indicate, for example, a time-frequency resource (e.g., resource block) assignment for ProSe resource region (in particular, resource assignment for each of ProSe channels), a resource assignment periodicity for ProSe resource region, a scaling factor, etc. The scaling factor can be used for a ProSe-enabled UE to calculate its own resource of the whole ProSe resources. For example, if four resource opportunities (e.g., four ProSe channels) are reserved per period as shown in FIG. 10 and if a scaling factor is given as eight, a ProSe-enabled UE can be assigned its ProSe resource every other period of ProSe resource assignment. The ProSe resource region may be reserved per cell.

Step 2 (S2-2): If ProSe-enabled UEs need to initiate a ProSe discovery procedure, a ProSe discovering UE (e.g., UE 1) may scan at least part of the ProSe resource region to find available ProSe resource(s) before sending a ProSe discovery signal. A subset of the ProSe resource region may be assigned to UE 1 for scanning. For example, one or more ProSe channels in the ProSe resource region may be implicitly assigned to UE 1 for scanning. For example, the one or more ProSe channels may be implicitly assigned based on at least one of information related to UE 1 or information related to ProSe. The information related to UE 1 may include an Identity (ID) of UE 1, and the information related to ProSe may include at least one of a service category and a service Identity (ID). For example, as shown in FIG. 10, a value of Least Significant Bit (LSB) 2 bit of UE's ID may be used to indicate which ProSe channel(s) is assigned for scanning as follows:

ID=00: 1st resource opportunity (e.g., 1st ProSe channel) of the ProSe resource region (or whole ProSe resource assigned for ProSe discovery signal).

ID=01: 2nd resource opportunity of the ProSe resource region.

ID=10: 3rd resource opportunity of the ProSe resource region.

ID=11: 4th resource opportunity of the ProSe resource region.

Step 3 (S2-3): If UE 1 detects available ProSe channel(s) (i.e., idle ProSe channel(s)), UE 1 may report a channel sensing result and request assignment of ProSe channel to an eNB. The channel sensing result may include information indicating one or more idle ProSe channels of the plural ProSe channels.

Step 4 (S2-4): The eNB may assign a ProSe channel used for transmission of a ProSe discovery signal to UE 1 based on the channel sensing result. Assignment of the ProSe channel may be signaled to each UE via unicast signaling such as a MAC message, a PDCCH signal and the like. ProSe channel assigned to UE 1 may be re-assigned to other UE if both UEs are not interfered each other. Assignment of the ProSe channel may be effective for limited time duration after the ProSe channel is assigned. To this end, UE 1 may run a timer set to the limited time duration after assignment of the ProSe channel is received. The value of the timer may be preset, or signaled separately (e.g., via information regarding the ProSe resource region) or together with the assignment of the ProSe channel. Assignment of the ProSe channel for ProSe discovery signal transmission can be managed by a cellular network entity such as eNB/MME/ProSe server/ProSe controller, based on UEs' location/proximity information in order to minimize interference.

Step 5 (S2-5): UE 1 may send a ProSe discovery signal by using the assigned ProSe channel. A conventional signal such as a pilot signal or a synchronization signal can be reused as the ProSe discovery signal in the assigned ProSe channel. In this case, if a UE detects the pilot signal or the synchronization signal, the UE may interpret usage of the pilot signal or the synchronization signal based on where the pilot signal or the synchronization signal is detected. For example, if the pilot signal or the synchronization signal is detected outside the assigned ProSe channel, it is interpreted as pilot signal or synchronization signal. Meanwhile, if the pilot signal or the synchronization signal is detected on the assigned ProSe channel, it is interpreted as a ProSe discovery signal. Alternatively, the ProSe discovery signal may be newly designed. In this case, the ProSe discovery signal may be designed by the following rules: (i) signal sequence is distinguishable from other ProSe-enabled UEs' signal sequences, and (ii) signal sequence may be easily detected by ProSe-enabled UE.

Step 6 (S2-6): If a ProSe discovered UE (e.g., UE 2) needs to initiate a ProSe discovery procedure, UE 2 may request the eNB to send resource allocation information for the ProSe discovery signal transmission by UE 1 (of which UE 2 wants to establish a ProSe connection).

Step 7 (S2-7): UE 2 may receive the resource allocation information for UE 1's ProSe discovery signal transmission. The resource allocation information for UE 1's ProSe discovery signal transmission may be recognized as being effective for limited time duration after the resource allocation information for UE 1's ProSe discovery signal transmission is received. To this end, UE 2 may run a timer set to the limited time duration after the resource allocation information for UE 1's ProSe discovery signal transmission is received. The value of the timer may be preset, or signaled separately (e.g., via information regarding the ProSe resource region) or together with the resource allocation information for UE 1's ProSe discovery signal transmission.

Step 8 (S2-8): UE 2 may scan one or more ProSe channels based on the resource allocation information for UE 1's ProSe discovery signal transmission.

Step 9 (S2-9): If UE 2 receives a ProSe discovery signal from UE 1, UE 2 may request a ProSe connection setup to UE 1.

Step 10 (S2-10): UE 1 may respond to UE 2 with a ProSe connection response, and a ProSe communication connection can be established between UE 1 and UE 2. Establishing the ProSe communication connection includes (i) resource assignment/negotiation to be used for ProSe direct communication (e.g., contention based resource, non-contention based resource, persistent resource allocation), and (ii) PHY parameter negotiation (e.g., MCS, Tx Power, HARQ parameter, channel measurement/report parameter). After the ProSe communication connection is established, data traffic can be exchanged through a ProSe direct communication path between UE 1 and UE 2.

The option 2 shows a network assisted ProSe discovery procedure initiated by UE 1. Meanwhile, UE 1 may initiate a Device to Device ProSe discovery procedure, (i) if UE 1 is in the coverage of cellular network but if UE 2 to be discovered is possible to be in proximity, or (ii) if UE 1 is not in the coverage of cellular network. In case of the Device to Device ProSe discovery procedure, the above Step 3 (S2-3) and Step 4 (S2-4) are skipped, and Step 5 (S2-5) can be replaced with: If UE 1 detects available ProSe channel(s) (i.e., idle ProSe channel(s)), UE 1 may send a ProSe discovery signal by using at least one of the available ProSe channel(s).

In addition, Step 6 (S2-6) and step 7 (S2-7) can be skipped if UE 1 could calculate the resource information for UE 2's ProSe discovery signal transmission without receiving eNB's signaling through a predefined rule (e.g., such as the rule of step 2 (S2-2))

If ProSe-enabled UEs are in a single cell (i.e., served by the same eNB), or if the ProSe-enabled UEs are in multiple cells with a synchronous pattern of allocation of radio resources to be used for ProSe discovery (for convenience, a single cell case or a single cell example), then the above examples will be fully functioning.

Figure 11:
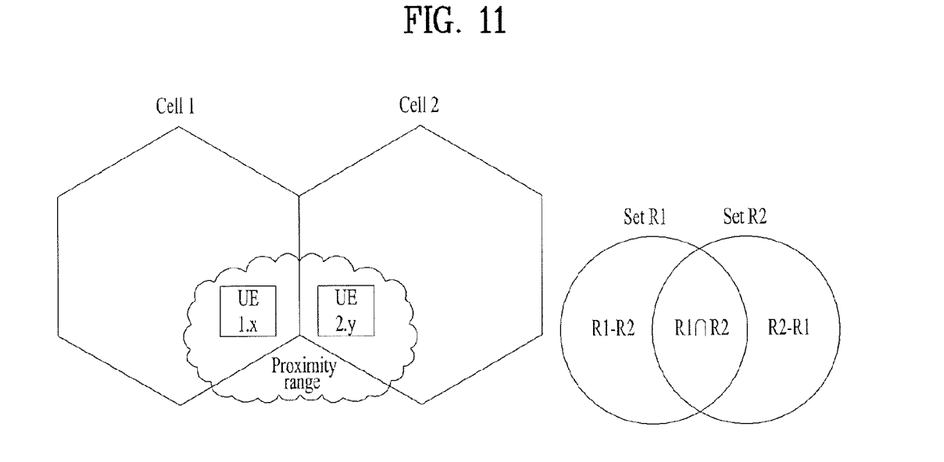
FIG. 11 shows a ProSe discovery scenario in multi cells.

FIG. 11 shows a ProSe discovery scenario in multi cells. If ProSe-enabled UEs are in the multiple cells which can potentially use different patterns of allocation of radio resources for the ProSe discovery purposes, the above proposed procedures may not properly serve since radio resource allocations for ProSe discovery in the multiple cells could be different. Thus additional procedure is needed for a ProSe discovery in multi cells. As an example, in case that radio resource allocation for ProSe discovery in cell 1 is Set R1 and radio resource allocation for ProSe discovery in cell 2 is Set R2, UE 1.x in cell 1 needs to know of (R2-R1) whereas UE 2.y in cell 2 needs to know of (R1-R2) assuming that they are served by different eNBs.

To this end, following procedures are further proposed for a multi-cell ProSe discovery.

For a single tier radio coverage plan: an eNB (hereinafter, reference eNB) may share a radio resource allocation pattern (or information) for ProSe discovery with its neighboring eNB(s). The neighboring eNB(s) of a reference eNB can be one or more eNBs providing radio coverage next to the reference cell coverage which the reference eNB is providing.

For multi-tier radio coverage plan: an eNB may share a radio resource allocation pattern (or information) for ProSe discovery with its upper tier eNB(s) (e.g., its umbrella cell's eNB) and its lower tier eNB(s), if any. An umbrella eNB provides a wider range of radio coverage so that one or more eNBs' radio coverage area(s) can be covered by its radio coverage.

In order to support above procedure, actions of each eNB may include: receiving the radio resource allocation pattern/information of its neighboring eNBs; analyzing the additional portion of radio resources allocated in the neighboring cell(s), respectively: for example, if my cell has an allocation of {resource 2} for ProSe discovery use and if {resource 1, resource 2} in a neighboring cell X, the eNB will compute and store {resource 1} with respect to cell X (need to do the same task for the other neighboring cell(s)); and sending this information, for example, separately from or together with SIB (as depicted in the single cell example). And, action of a UE may include: being able to distinguish the radio resource allocation of its residing cell and that of neighboring cell(s); and performing scanning for ProSe discovery based on the radio resource allocation of its residing cell and that of neighboring cell(s) when needed.

Next, collision avoidance of ProSe resource allocation will be explained. There is a case in which two or more ProSe-enabled UEs in a close proximity may select the same resources (e.g., same ProSe channel). This will lead into waste of resources and further increase interference between ProSe-enabled UEs.

In order to address the problem, following methods are proposed. In explicit method, when two or more ProSe-enabled UEs may report the same resource as available, the eNB can select one of them by sending "ACK" or "NACK" type response to the ProSe-enabled UEs requesting the same resource. Alternatively, the eNB may select different resources and informs to ProSe-enabled UEs of resource allocations in this collision of request. In implicit method, a ProSe-enabled UE may select and listen the selected resources, and if the selected resources is determined be busy (i.e., another ProSe-enabled UE uses the selected resource), the ProSe-enabled UE may randomly delay the transmissions of a ProSe discovery signal using the resources selected. ProSe-enabled UEs can merely delay starting of the transmissions or may listen possible transmission over the resources selected until the times for transmissions come. Alternatively, ProSe-enabled UEs may simply transmit the ProSe discovery signal using the resources selected and then periodically or aperiodically listen status of the selected resources to determine whether other ProSe-enabled UEs also use the same resources. Listening instants may be as disparate as possible by adjusting listening interval, periodicity, and/or etc.

An eNB can specify whether explicit or implicit method is allowed based on the number of ProSe-enabled UEs, the degree of resource utilization, and etc. This information may be broadcast using system information such as SIB. Furthermore, the eNB may broadcast the status of the available resources explicitly or implicitly. For explicit case, the eNB may enumerate the available resources or may use a bitmap in which "1" or "0" in specific position in the bitmap represent the availability of the resource that is mapped into the specific position. For implicit case, the eNB may broadcast the last index of the allocated resources assuming resource allocation in orderly fashion (i.e., resources of 1st index to the indicated index are allocated as being available for ProSe discovery signal).

In addition, a set of ProSe discovery signals may be predefined, and information about the set of ProSe discovery signals may be broadcasted (e.g., via SIB). In this case, a ProSe-enabled UE can choose one of the predefined set of ProSe discovery signals. If ProSe-enabled UEs send different ProSe discovery signals, a ProSe-enabled UE can detect and identify each of those ProSe discovery signals even though multiple ProSe-enabled UEs select the same frequency/time resource. Selection of ProSe discovery signal can be followed by a predefined rule (e.g., UE's ID based) or random operation.

Figure 12:
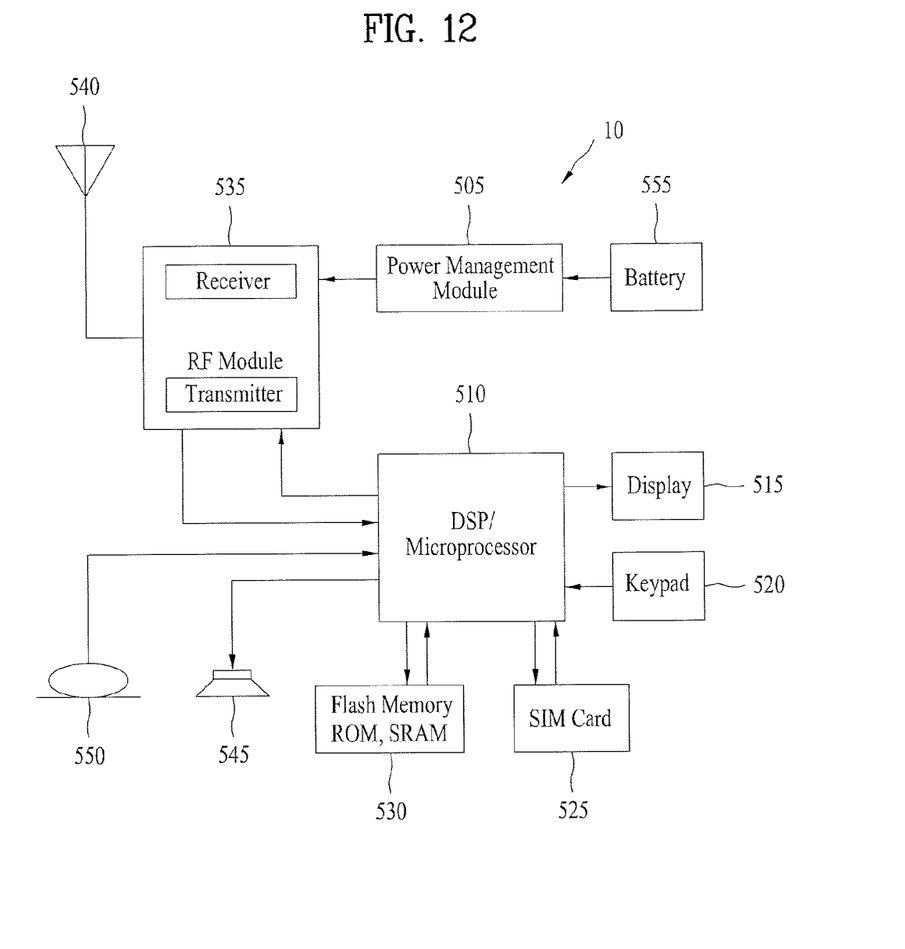
FIG. 12 illustrates a block diagram of a UE or Mobile Station (MS).

FIG. 12 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined, with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a proximity-based service, specifically, for cooperative discovery for the proximity-based service.

The invention claimed is:

1. A method of performing a discovery procedure for a Proximity-Based Service (ProSe) by a User Equipment (UE) in a cellular communication system, the method comprising:

receiving first resource allocation information for plural ProSe channels from a base station via a broadcast signal;

sensing one of the plural ProSe channels, the one of the plural ProSe channels being identified using least significant bits of a ProSe service identity (ID);

transmitting a sensing result for one of the plural ProSe channels to the base station, when the one of the plural ProSe channels is detected as being idle and if the UE is within a coverage of the cellular network system; and transmitting a discovery signal via the one of the plural ProSe information channels to another UE, when the one of the plural ProSe channels is detected as being idle and if the UE is out of the coverage of the cellular network system.

2. The method of claim 1, wherein the sensing result includes information indicating one or more idle ProSe channels of the plural ProSe channels.

3. The method of claim 1, wherein the sensing is performed on a subset of the plural ProSe channels.

4. The method of claim 3, wherein the subset of the plural ProSe channels is identified by using at least one of information related to the UE or information related to the ProSe.

5. The method of claim 4, wherein the information related to the UE includes a UE ID, and the information related to the ProSe includes at least one of a service category and a service ID.

6. A User Equipment (UE) configured to perform a discovery procedure for a Proximity-based Service (ProSe) in a cellular communication system, the UE comprising:
a radio frequency (RF) unit; and
a processor, wherein the processor is configured:
to receive first resource allocation information for plural ProSe channels from a base station via a broadcast signal,
to sense one of the plural ProSe channels, the one of the plural ProSe channels being identified using least significant bits of a ProSe service identity (ID),
to transmit a sensing result for the one of the plural ProSe channels to the base station, when the one of the plural ProSe channel is detected as being idle and if the UE is within a coverage of the cellular network system, and
to transmit a discovery signal via the one of the plural ProSe allocation information channels to another UE, when the one of the plural ProSe channels is detected as being idle and if the UE is out of the coverage of the cellular network system.

7. The UE of claim 6, wherein the sensing result includes information indicating one or more idle ProSe channels of the plural ProSe channels.

8. The UE of claim 6, wherein the sensing is performed on a subset of the plural ProSe channels.

9. The UE of claim 8, wherein the subset of the plural ProSe channels is identified by using at least one of information related to the UE or information related to the ProSe.

10. The UE of claim 9, wherein the information related to the UE includes a UE ID, and the information related to the ProSe includes at least one of a service category and a service ID.

* * * * *